US010060326B2

(12) United States Patent
Kanzaka et al.

(10) Patent No.: US 10,060,326 B2
(45) Date of Patent: Aug. 28, 2018

(54) COOLING APPARATUS FOR INTERNAL COMBUSTION ENGINE

(71) Applicant: TOYOTA JIDOSHA KABUSHIKI KAISHA, Toyota-shi (JP)

(72) Inventors: Ryuji Kanzaka, Miyoshi (JP); Yoshikazu Shinpo, Nisshin (JP); Kenji Isaka, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 19 days.

(21) Appl. No.: 15/269,283

(22) Filed: Sep. 19, 2016

(65) Prior Publication Data

US 2017/0089250 A1  Mar. 30, 2017

(30) Foreign Application Priority Data

Sep. 29, 2015  (JP) .................................. 2015-192179

(51) Int. Cl.
| | |
|---|---|
| *F01P 3/02* | (2006.01) |
| *F01P 7/16* | (2006.01) |
| *F01M 5/00* | (2006.01) |
| *F01P 11/08* | (2006.01) |
| *G05D 23/12* | (2006.01) |

(52) U.S. Cl.
CPC .............. *F01P 3/02* (2013.01); *F01M 5/001* (2013.01); *F01M 5/007* (2013.01); *F01P 7/16* (2013.01); *F01P 11/08* (2013.01); *G05D 23/122* (2013.01); *F01P 2060/04* (2013.01); *F01P 2060/08* (2013.01)

(58) Field of Classification Search
CPC ........ F01P 3/02; F01P 5/12; F01P 7/16; F01P 7/165; F01M 5/001; F01M 5/005; F01M 5/007
See application file for complete search history.

(56) References Cited

U.S. PATENT DOCUMENTS

| | | | |
|---|---|---|---|
| 2003/0217707 A1 | 11/2003 | Iwasaki | |
| 2011/0023799 A1* | 2/2011 | Lenz | ........................ F01P 3/02 123/41.79 |
| 2012/0211216 A1* | 8/2012 | Noonchester | .......... F01M 5/021 165/271 |

FOREIGN PATENT DOCUMENTS

| | | |
|---|---|---|
| JP | 2003-286846 | 10/2003 |
| JP | 2009-97351 A | 5/2009 |
| JP | 2014-47725 | 3/2014 |
| JP | 2014-145341 A | 8/2014 |
| WO | WO 2007/040130 A1 | 4/2007 |

* cited by examiner

*Primary Examiner* — Jacob Amick
(74) *Attorney, Agent, or Firm* — Oblon, McClelland, Maier & Neustadt, L.L.P.

(57) ABSTRACT

A cooling apparatus for an engine includes an oil warmer, an engine internal passage, a warmer passage, a water pump, and a thermostat. The warmer passage connects an outlet of the internal passage to an inlet of the internal passage. The thermostat regulates an amount of coolant that flows into the oil warmer. The thermostat includes a valve member, a body, and a plurality of types of wax. The thermostat determines a degree of opening of the valve member in accordance with amounts of expansion of the respective types of wax caused by melting of the respective types of wax. The types of wax include a first wax, which melts at a first temperature, and a second wax, which melts at a second temperature which is higher than the first temperature.

11 Claims, 7 Drawing Sheets

COOLING APPARATUS FOR INTERNAL COMBUSTION ENGINE

BACKGROUND

The present disclosure relates to a cooling apparatus for an internal combustion engine that includes an oil warmer, which performs heat exchange between engine coolant and transmission lubricant.

Japanese Laid-Open Patent Publication No. 2003-286846 discloses a cooling apparatus that includes an oil cooler (oil warmer), which performs heat exchange between coolant of an internal combustion engine and lubricant of a transmission. The apparatus includes a warmer passage, which extends from the outlet of an engine internal passage, through which coolant flows, to the inlet of the internal passage. The oil warmer is located in the middle of the warmer passage. The warmer passage includes an induction pipe for drawing coolant into the oil warmer and a discharge pipe for discharging coolant from the oil warmer. The warmer passage is also connected to a bypass pipe, which extends from the induction pipe to the discharge pipe while bypassing the oil warmer. A thermostat is provided in the discharge pipe at a part to which the bypass pipe is connected. The thermostat is closed to cut off the flow of coolant from the oil warmer to the downstream side of the thermostat in the discharge pipe.

The thermostat includes a shape-memory plastic and is mechanically opened at about 80° C. Thus, when the temperature of coolant that flows from the outlet of the internal coolant passage of the engine into the induction pipe is lower than 80° C., the coolant bypasses the oil warmer and flows into the inlet of the internal coolant passage via the bypass passage. In contrast, when the temperature of coolant flowing into the induction pipe is higher than or equal to 80° C., the thermostat is opened to allow the coolant to flow into the oil warmer.

This apparatus allows the heat of coolant to be transferred to lubricant on condition that the warm-up of the internal combustion engine has progressed.

When the temperature of coolant has reached about 80° C. due to starting of the engine, the temperature inside the oil warmer may still be significantly lower than 80° C. If the coolant temperature reaches 80° C. in this state so that the thermostat is opened, a great amount of coolant, the temperature of which is significantly higher than that of the oil warmer, flows into the oil warmer. This may cause a thermal shock in the oil warmer.

SUMMARY

Accordingly, it is an objective of the present disclosure to provide a cooling apparatus for an internal combustion engine that suppresses thermal shock in an oil warmer, while transferring the heat of coolant to lubricant via the oil warmer on condition that the warm-up of the internal combustion engine has progressed.

To achieve the foregoing objective and in accordance with one aspect of the present disclosure, a cooling apparatus for an internal combustion engine is provided that includes an oil warmer, which performs heat exchange between coolant of the engine and lubricant of a transmission, an internal passage, which is provided in the engine and through which the coolant flows, a warmer passage, a water pump, and a thermostat. The warmer passage causes coolant that has flowed out through an outlet of the internal passage to flow into an inlet of the internal passage. The oil warmer is connected to a middle section of the warmer passage. The water pump is configured to cause the coolant in the internal passage and the warmer passage to flow. The thermostat is configured to regulate an amount of coolant that flows into the oil warmer. The thermostat includes a valve member, which is configured to close the warmer passage, a body, and a plurality of types of wax, which are accommodated in the body and separated from each other. The thermostat is configured to determine a degree of opening of the valve member in accordance with amounts of expansion of the respective types of wax caused by melting of the respective types of wax. The body contacts one of the lubricant and the coolant in the warmer passage. The types of wax include a first wax, which melts at a first temperature, and a second wax, which melts at a second temperature which is higher than the first temperature.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure may be understood by reference to the following description together with the accompanying drawings.

DETAILED DESCRIPTION

<First Embodiment>

A cooling apparatus for an internal combustion engine according to a first embodiment will now be described with reference to the drawings.

Figure 1:
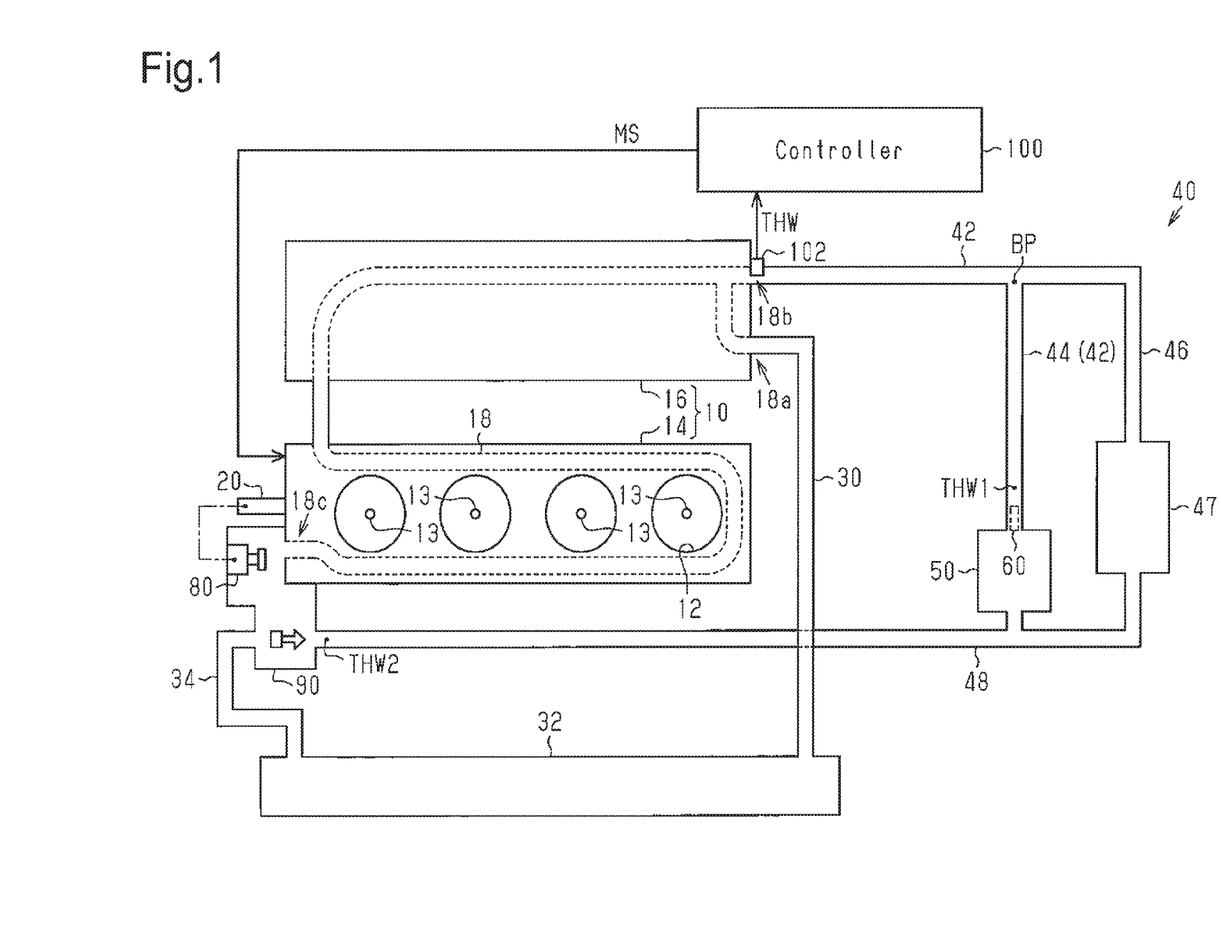
FIG. 1 is a diagram showing an engine system equipped with a cooling apparatus for an internal combustion engine according to a first embodiment.

As shown in FIG. 1, an internal combustion engine 10 includes cylinders 12, in each of which an ignition plug 13 is provided. That is, the engine 10 of the present embodiment is a spark-ignition engine that uses gasoline or the like as fuel. The engine 10 includes a cylinder block 14 and a cylinder head 16. An internal passage 18 for coolant is provided in the cylinder block 14 and the cylinder head 16.

Coolant that flows into the internal passage 18 through an inlet 18c flows out through outlets 18a, 18b. The outlet 18a is connected to a radiator 32 via an outlet-side radiator passage 30. Coolant that flows out through the outlet 18a passes through the radiator 32 and then flows into the inlet 18c of the internal passage 18 via an inlet-side radiator passage 34. The radiator 32 is a member that performs heat exchange between coolant and outside air. Particularly, the radiator 32 promotes release of the heat of coolant to the outside air by using relative wind and the like generated as the vehicle mounting the engine 10 travels.

The coolant that has flowed out through the outlet 18b of the internal passage 18 is allowed to flow into an oil warmer 50. The oil warmer 50 is a member that performs heat exchange between coolant and lubricant of a vehicle transmission (a continuously variable transmission in the present embodiment). That is, when the temperature of the lubricant is low, the oil warmer 50 transfers the heat of the coolant to the lubricant to increase the lubricant temperature, allowing the lubricant temperature to quickly reach a prescribed temperature range in which the power transmission loss in the transmission is diminished. In contrast, when the lubricant temperature is higher than the prescribed temperature range, the oil warmer 50 releases heat to the coolant, thereby restraining the lubricant temperature from being excessively increased.

Specifically, an outlet-side warmer passage 42 is connected to the outlet 18b, and a thermostat 60 for the oil warmer 50 is arranged in the outlet-side warmer passage 42. The oil warmer 50 is connected to the thermostat 60, and an inlet-side warmer passage 48 is connected to the oil warmer 50. The inlet-side warmer passage 48 is connected to the inlet 18c of the internal passage 18.

The outlet-side warmer passage 42 is connected to a branch passage 46 at a branch point BP. Hereinafter, a section of the outlet-side warmer passage 42 that is downstream of the branch point BP will be referred to as a direct-coupling passage 44. The thermostat 60 is provided in the direct-coupling passage 44.

A heater core 47 is provided in the branch passage 46. The heater core 47 is a heat exchanger that performs heat exchange between air delivered to the passenger compartment and coolant. The downstream side of the heater core 47 is connected to the inlet-side warmer passage 48. Coolant that has passed through the heater core 47 flows into the inlet 18c of the internal passage 18 via the inlet-side warmer passage 48.

The outlet-side warmer passage 42, the inlet-side warmer passage 48, and the branch passage 46 form a bypass passage 40, which delivers the coolant that has flowed out through the outlet 18b to the inlet 18c of the internal passage 18, while bypassing the radiator 32.

The coolant in the internal passage 18, the coolant in a warmer passage, which includes the outlet-side warmer passage 42 and the inlet-side warmer passage 48, and the coolant in the branch passage 46 are caused to flow by actuation of a water pump 80. The water pump 80 is an engine-driven pump that is mechanically coupled to a crankshaft 20 of the engine 10. The water pump 80 is actuated by the force of the crankshaft 20.

A thermostat 90 for the radiator 32 is provided at the confluence of the inlet-side warmer passage 48 and the inlet-side radiator passage 34. The thermostat 90 functions as a flow-rate regulator and regulates the amount of coolant that flows out through the outlets 18a, 18b of the internal passage 18 and to the outlet-side radiator passage 30 and the bypass passage 40.

A controller 100 is configured to output operational signals to various actuators such as the ignition plugs 13, thereby controlling the control amounts of the engine 10 (the torque, the exhaust characteristics, and the like). The controller 100 may be configured, for example, by circuitry, that is, at least one dedicated hardware circuit such as an application-specific integrated circuit (ASIC), at least one processing circuit that operates according to a computer program (software), or a combination of these. The processing circuit includes a CPU and memories (ROM, RAM, and the like), which store programs executed by the CPU. The memories, or computer readable media, include any type of media that are accessible by general-purpose computers and dedicated computers. When controlling the control amounts, the controller 100 reads in a temperature THW of coolant that is detected by a temperature sensor 102 provided at the outlet 18b.

Figure 2:
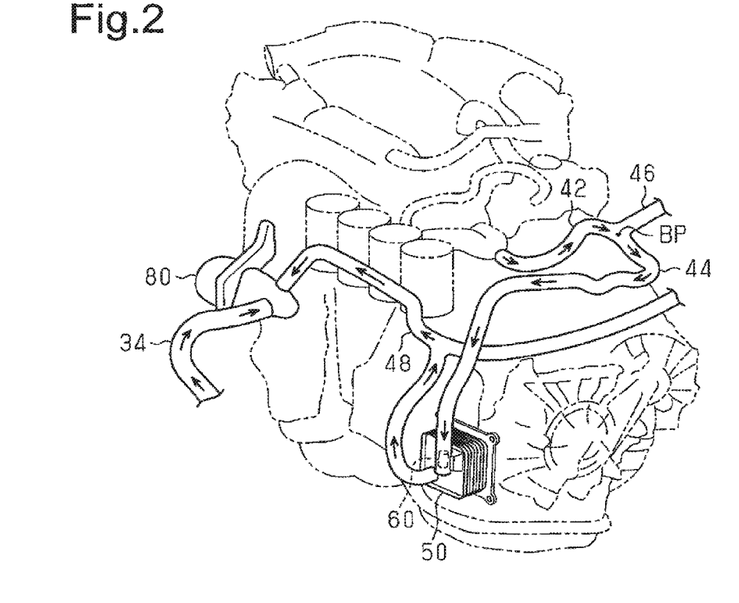
FIG. 2 is a perspective view partially showing the cooling passage structure according to the first embodiment.

FIG. 2 shows a part of the structure of a radiator passage, which includes the outlet-side radiator passage 30 and the inlet-side radiator passage 34, and a cooling passage, which includes the bypass passage 40. The upper side of FIG. 2 agrees with the upper side in the vertical direction of the vehicle.

As shown in FIG. 2, the thermostat 60 for the oil warmer 50 is located below the branch point BP in the vertical direction of the vehicle. This configuration is achieved by providing a passage section that is directed downward in the vehicle vertical direction in the direct-coupling passage 44 of the outlet-side warmer passage 42.

Figure 3:
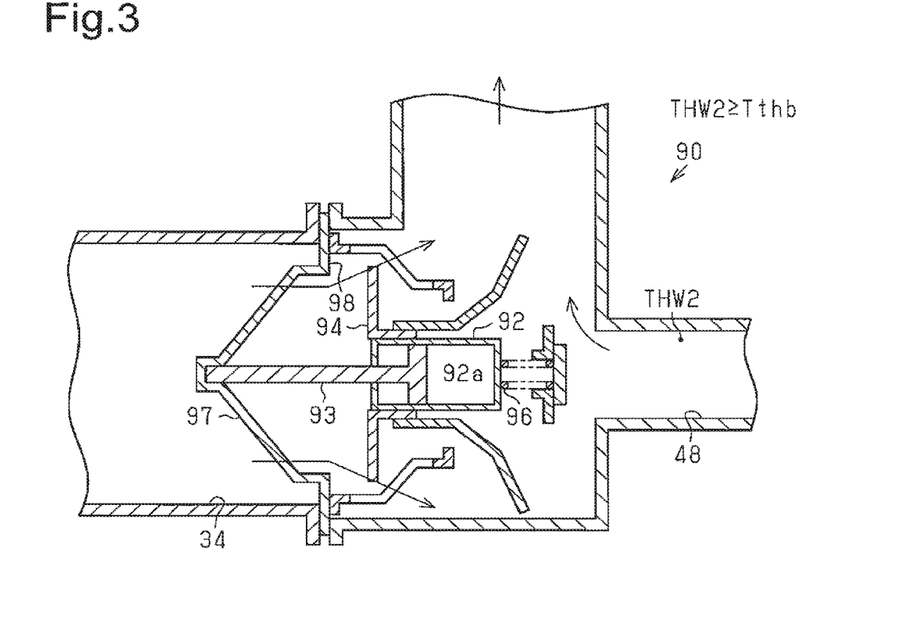
FIG. 3 is a cross-sectional view showing the thermostat for the radiator according to the first embodiment.

FIG. 3 shows a cross-sectional structure of the thermostat 90 for the radiator 32.

The thermostat 90 contains wax 92a, which expands when melting and contracts when solidifying. A piston 93 protrudes out from a temperature-sensing portion 92. When the wax 92a melts and expands, the protruding amount of the piston 93 from the temperature-sensing portion 92 changes. A cooling cutoff valve 94 is coupled to the temperature-sensing portion 92. The end of the piston 93 that is opposite from the temperature-sensing portion 92 is fixed to a main housing 97, which is fixed to the inlet-side radiator passage 34. The temperature-sensing portion 92 is urged by the elastic force of a spring 96 toward a valve seat portion 98 formed by the main housing 97.

When the wax 92a is solid, the cooling cutoff valve 94 is held in contact with the valve seat portion 98 by the elastic force of the spring 96. In other words, the thermostat 90 is in a closed state. In this case, the coolant does not flow from the radiator 32 into the inlet 18c of the internal passage 18 shown in FIG. 1 via the inlet-side radiator passage 34.

In contrast, when the wax 92a melts, the wax 92a expands and increases the protruding amount of the piston 93 from the temperature-sensing portion 92. However, since one end of the piston 93 is fixed to the main housing 97, the piston 93 itself is not displaced. Instead, the temperature-sensing portion 92 is displaced away from the main housing 97 against the elastic force of the spring 96. This displaces the cooling cutoff valve 94, which is fixed to the temperature-sensing portion 92, away from the valve seat portion 98, so that the thermostat 90 is switched to an open state.

When the thermostat 90 is in the closed state, the coolant that flows into the inlet 18c of the internal passage 18 shown in FIG. 1 is limited to the coolant that flows from the inlet-side warmer passage 48. In contrast, when the thermostat 90 is in the open state, the coolant that flows into the inlet 18c of the internal passage 18 shown in FIG. 1 includes both the coolant that flows from the inlet-side warmer passage 48 and the coolant that flows from the inlet-side radiator passage 34.

When a temperature THW2 of coolant that contacts the temperature-sensing portion 92 is higher than or equal to the melting point of the wax 92a, the thermostat 90 is opened. This temperature, that is, the melting point of the wax 92a, will be referred to as a cooling threshold temperature Tthb. The cooling threshold temperature Tthb is a temperature at which the amount of the coolant that flows out through the outlet 18a of the internal passage 18 and into the radiator 32 is controlled to be a value greater than zero by the thermostat 90. The cooling threshold temperature Tthb is set to a value in the range from 85 to 110° C.

Figure 4:
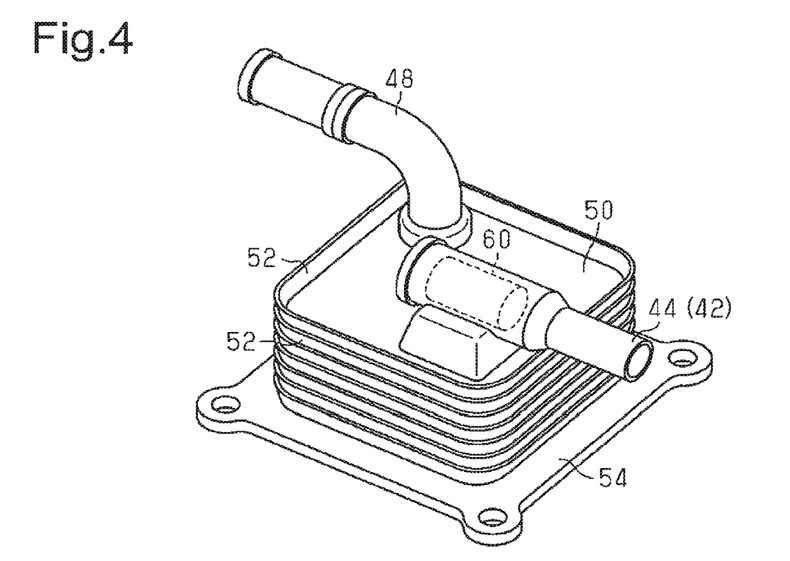
FIG. 4 is a perspective view showing the oil warmer and the thermostat for the oil warmer according to the first embodiment.

FIG. 4 shows the arrangement of the oil warmer 50 and the thermostat 60 for the oil warmer 50.

As shown in FIG. 4, the oil warmer 50 is a laminated body of a plurality of pan-shaped plates 52. The plates 52 define parts of the passages for coolant and lubricant. The plates 52 are made of an aluminum alloy with a coating of brazing filler metal. The plates 52 are brazed together to form the oil warmer 50.

Specifically, the oil warmer 50 includes a base plate 54, which is attached to the transmission. Although not illustrated, the base plate 54 has an inlet port and an outlet port formed on the side opposite from the plates 52. Lubricant is drawn into the oil warmer 50 from the transmission via the inlet port, and the lubricant in the oil warmer 50 is discharged to the transmission via the outlet port.

The plate 52 that is at the farthest position from the base plate 54 has an outlet port for coolant, which is connected to the inlet-side warmer passage 48. Also, the plate 52 that is at the farthest position from the base plate 54 has an inlet port for coolant, which is connected to the direct-coupling passage 44. Although not illustrated, the plates 52 between the base plate 54 and the plate 52 at the farthest position from the base plate 54 have inlets and outlets for coolant and lubricant. The space between any two adjacent plates 52 is divided into a coolant passage and a lubricant passage by members different from the plates 52. Particularly, a part of the direct-coupling passage 44 in which the thermostat 60 is provided is arranged to contact the oil warmer 50. The direct-coupling passage 44, which contacts the oil warmer 50, is made of the same material as that of the oil warmer 50, that is, an aluminum alloy. In reality, the members shown in FIG. 4 are unitized. In other words, a part of the direct-coupling passage 44 and a part of the inlet-side warmer passage 48 form a single unit together with the oil warmer 50.

Figure 5:
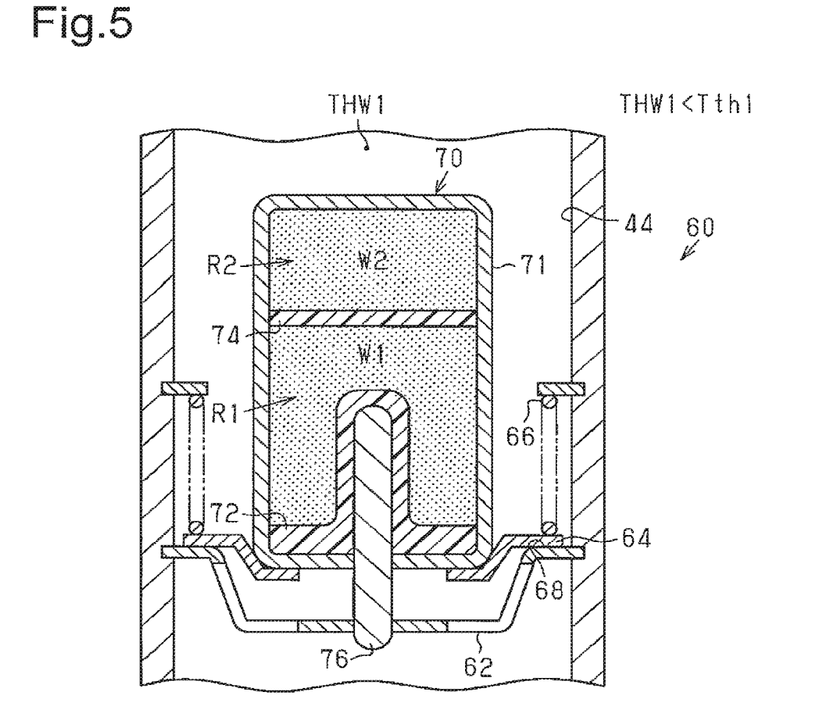
FIG. 5 is a cross-sectional view showing the thermostat for the oil warmer according to the first embodiment.

FIG. 5 illustrates the cross-sectional structure of the thermostat 60.

As shown in FIG. 5, the thermostat 60 includes a thermostat element 70, a piston fixing portion 62, which is fixed to the direct-coupling passage 44, a valve member 64, which is coupled to a body 71 of the thermostat element 70, and a spring 66. The valve member 64 is urged by the elastic force of the spring 66 toward a valve seat portion formed by the piston fixing portion 62.

The thermostat element 70 has in it a first thermo-wax chamber R1, which is defined by the body 71 and partition member 72, 74, and a second thermo-wax chamber R2, which is defined by the body 71 and the partition member 74. The first thermo-wax chamber R1 is filled with first wax W1, and the second thermo-wax chamber R2 is filled with second wax W2. The first wax W1 and the second wax W2 are each known wax that expands when melting and contracts when solidifying. The thermostat element 70 includes a piston 76, which is partly accommodated in a space defined by the body 71 and protrudes from the body 71 and is fixed to the piston fixing portion 62. The partition member 72 is made of a material that is easily stretched, such as rubber. The partition member 74 is movable relative to the body 71 in the axial direction of the piston 76.

A first temperature Tth1, which is the melting point of the first wax W1, is lower than a second temperature Tth2, which is the melting point of the second wax W2.

When the first wax W1 and the second wax W2 are solid, the elastic force of the spring 66 holds the valve member 64 in contact with the valve seat portion 68. In other words, the thermostat 60 is in a closed state. FIG. 5 illustrates the closed state of the thermostat 60. In this case, the coolant in the outlet-side warmer passage 42 cannot pass through the thermostat 60. When switched to the closed state, the thermostat 60 functions as an opening-closing device that closes all the paths through which the coolant that has reached the thermostat 60 from the upstream side flows to the downstream side. In other words, the direct-coupling passage 44 has a structure without a passage that branches off from a part in the vicinity of the thermostat 60 to allow coolant to flow out to the inlet 18c even in the closed state of the thermostat 60.

Figure 6:
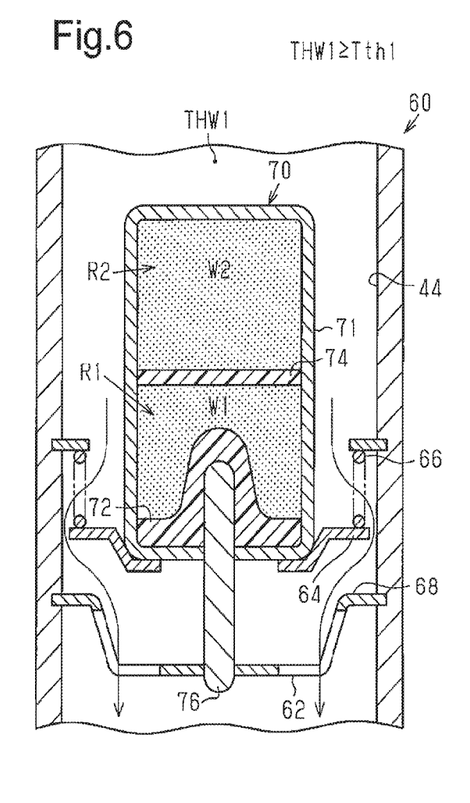
FIG. 6 is a cross-sectional view showing the thermostat for the oil warmer in an open state.

In contrast, when the temperature THW1 of the coolant that contacts the thermostat 60 is higher than or equal to the first temperature Tth1, the protruding amount of the piston 76 from the body 71 increases as shown in FIG. 6. Since the piston 76 is fixed to the piston fixing portion 62, the body 71 is displaced away from the piston fixing portion 62 when the protruding amount increases. Accordingly, the valve member 64, which is coupled to the thermostat element 70, is displaced away from the piston fixing portion 62 against the elastic force of the spring 66, so that the valve member 64 separates from the valve seat portion 68. In other words, the thermostat 60 is switched to the open state.

In the present embodiment, the first temperature Tth1 is set to a temperature at which opening of the thermostat 60 does not significantly hamper the warm-up of the engine 10 when the engine 10 is started. There is an ideal temperature of the engine 10 in reducing the fuel consumption. As long as the temperature of the lubricant in the oil warmer 50 is not significantly lower than the lower limit value Tw (in this example, assumed to be 70° C.) of the ideal temperature, it is expected that the warm-up of the engine 10 will not be significantly hampered. In the present embodiment, the first temperature Tth1 is, for example, 40° C.

The second temperature Tth2 is set to a value lower than the cooling threshold temperature Tthb. In the present embodiment, the second temperature Tth2 is set to, for example, 75° C.

Operation of the present embodiment will now be described.

Figure 7:
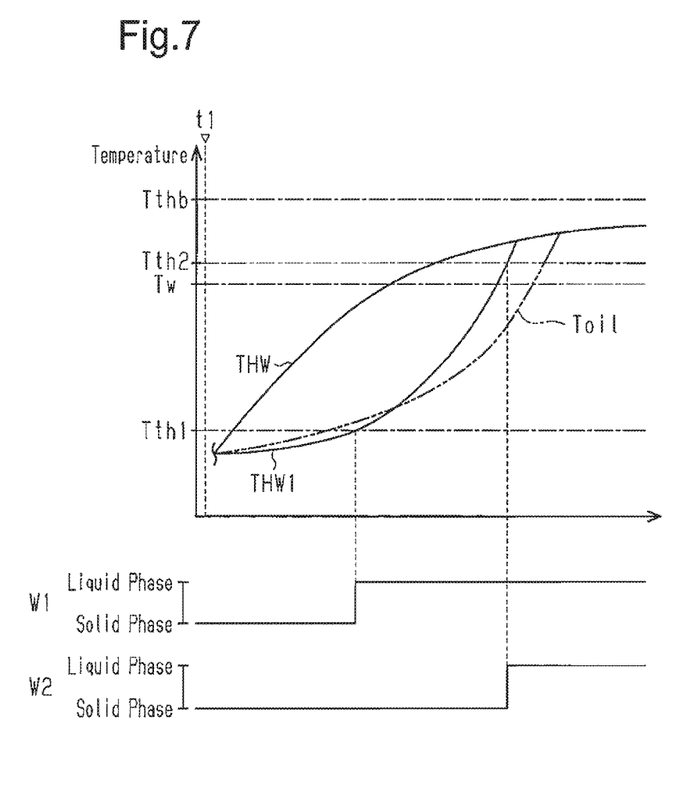
FIG. 7 is a timing chart showing changes in the temperature of coolant according to the first embodiment.

FIG. 7 shows changes in the temperature THW of coolant at the outlet 18b, the temperature THW1 of coolant that is contacting the body 71 of the thermostat 60, and the temperature Toil of lubricant when the engine 10 is started from the state in which the engine temperature is lower than or equal to a predetermined temperature (for example, 30° C.) The lower section of FIG. 7 shows states of the first wax W1 and the second wax W2. FIG. 7 merely shows a simplified switching between the solid phase and the liquid phase of the waxes W1 and W2 depending on whether the temperature THW1 reaches the melting points of the waxes W1, W2. That is, FIG. 7 does not depict transitional states, which actually appear and in which the liquid phase and the solid phase are mixed.

When the engine 10 is started at time t1, the coolant temperature THW at the outlet 18b rises, accordingly. In this example, the thermostat 60 is in the closed state immediately before the engine 10 is started. When the crankshaft 20 rotates as the engine 10 is started, the water pump 80 is operated. This causes the coolant in the internal passage 18 to flow into the heater core 47 via the branch passage 46. After exiting the heater core 47, the coolant flows into the inlet 18c of the internal passage 18 via the inlet-side warmer passage 48. At this point in time, since the thermostat 90 for the radiator 32 is also in the closed state, the coolant that has exited the internal passage 18 flows into the inlet 18c while bypassing the radiator 32.

If the thermostat 60 for the oil warmer 50 is in the closed state, the coolant in the direct-coupling passage 44 is retained. Thus, the coolant particularly in the part of the direct-coupling passage 44 in the vicinity of the thermostat 60 scarcely receives heat from the coolant that has flowed out through the outlet 18b of the internal passage 18. However, as shown in FIG. 4, in the present embodiment, the part of the direct-coupling passage 44 in which the thermostat 60 is provided is arranged to contact the oil warmer 50 and is configured to receive heat from the oil warmer 50. The power transmission loss in the transmission is turned into heat and increases the temperature of the lubricant. Thus, the temperature Toil of the lubricant in the oil warmer 50 and the temperature THW1 of the coolant that is contacting the thermostat 60 are increased by the heat generated in the transmission. The rise rate of the temperature THW1 is lower than the rise rate of the temperature of the coolant in the internal passage 18. Therefore, in FIG. 7, the rise rate of the temperature Toil is lower than the rise rate of the temperature THW. Also, the rise rate of the temperature THW1 of the coolant that is contacting thermostat 60 is lower than or equal to the rise rate of the temperature Toil of the lubricant since the coolant receives heat from the oil warmer 50.

When the temperature THW1 of the coolant that is contacting thermostat 60 becomes higher than or equal to the first temperature Tth1, the first wax W1 melts and increases in volume, so that the thermostat 60 is opened. Accordingly, the coolant that has flowed out through the outlet 18b of the internal passage 18 is allowed to flow into the oil warmer 50 via the outlet-side warmer passage 42. Immediately after the thermostat 60 is opened, the coolant downstream of the branch point BP reaches the thermostat 60 and the temperature THW1 may temporarily drop. However, such a phenomenon is not depicted in FIG. 7.

When the coolant that has flowed out from the internal passage 18 starts flowing into the oil warmer 50, the lubricant in the oil warmer 50 receives the heat generated in the combustion chambers of the engine 10 via the coolant. Also, when the coolant that has flowed out from the internal passage 18 starts flowing into the oil warmer 50, the rise rate of the temperature THW1 increases. When the temperature THW1 reaches the second temperature Tth2, the second wax W2 melts. Accordingly, the second wax W2 expands and the volume of the second thermo-wax chamber R2 is increased. Thus, compared to a case in which only the first wax W1 melts, the protruding amount of the piston 76 from the body 71 is further increased, so that the distance between the valve member 64 and the valve seat portion 68 is further increased. In other words, the degree of opening of the thermostat 60 is increased. This increases the flow rate of the coolant flowing into the oil warmer 50, and thus increases the quantity of heat transferred from the coolant to the lubricant in the oil warmer 50 per unit time.

The second temperature Tth2 is set to a temperature higher than an expected highest value of the temperature THW of the outlet 18b of the internal passage 18 when the temperature THW1 of the coolant contacting the thermostat 60 becomes the first temperature Tth1 in a case in which the engine 10 is started from a temperature lower than or equal to the predetermined temperature. This setting is intended to delay the time at which the second wax W2 starts melting relative to the time at which the first wax W1 starts melting.

As described above, the transmission has a prescribed temperature range in which the power transmission loss is small. To cause the lubricant temperature to quickly reach the prescribed temperature range, the thermostat 60 is preferably open from the starting of the engine 10. In that case, however, the warm-up of the engine 10 would be delayed. The effect of reduction in fuel consumption by quickly warming up the engine 10 is greater than the effect of reduction in fuel consumption by causing the lubricant temperature to quickly rise to the prescribed temperature range. However, after the engine 10 is warmed up to some extent, the amount of fuel consumption is further reduced by quickly raising the lubricant temperature. Thus, the thermostat 60 has a function of allowing the engine 10 and the lubricant to be adequately warmed up to reduce the fuel consumption.

As described above, the present embodiment achieves the following advantages.

(1) The thermostat 60 for the oil warmer 50 includes the first wax W1, which melts at the first temperature Tth1, and the second wax W2, which melts at the second temperature Tth2 higher than the first temperature Tth1. Compared to a case in which the first wax W1 and the second wax W2 both melt, the degree of opening of the thermostat 60 is small when only the first wax W1 melts. Thus, when the coolant that has received heat from the engine 10 in the internal passage 18 starts flowing into the oil warmer 50 by opening of the thermostat 60, the amount of coolant inflow is limited. This reduces the thermal shock in the oil warmer 50. This reduces the thermal shock in the oil warmer 50 while transferring the heat of the coolant to the lubricant via the oil warmer 50 on condition that the warm-up of the engine 10 has progressed.

(2) The thermostat 60 is provided in the direct-coupling passage 44. Thus, when the thermostat 60 is closed, no passages exist that are not closed and through which the coolant that has reached the thermostat 60 from the upstream side flows to the downstream side of the thermostat 60. In other words, the bypass passage 40 is configured such that the coolant that has reached the thermostat 60 is restrained or prevented from flowing to the downstream side of the thermostat 60 when the thermostat 60 is in the closed state. This simplifies the passage structure compared to a case in which there is a passage that is not closed even when a thermostat is in the closed state such as a part that accommodates the thermostat 90, which regulates the amount of fluid that flows out to the radiator 32 and the bypass passage 40. Therefore, the thermostat 60, which blocks the coolant that flows through the oil warmer 50, restricts the cooling apparatus from being larger in size.

(3) The part of the direct-coupling passage 44 in which the thermostat 60 is provided is held in contact with the oil warmer 50. This allows the first wax W1 in the thermostat 60 to melt by receiving heat from the lubricant in the oil warmer 50. Thus, even if the temperature of the coolant that is retained in a section in the direct-coupling passage 44 that is upstream of the thermostat 60 scarcely increases, opening of the thermostat 60 is prevented from being significantly delayed. This restricts the lubricant temperature from being lower than the prescribed temperature range for an excessively extended period.

(4) The second temperature Tth2 is set to be lower than the cooling threshold temperature Tthb, which is the temperature at which the amount of coolant that flows out through the outlet 18a of the internal passage 18 to the radiator 32 is controlled to be a value greater than zero by the thermostat 90 of the radiator 32. Thus, the degree of opening of the thermostat 60 is increased due to expansion of the second wax W2 before the heat of coolant is transferred to the radiator 32. Therefore, compared to a case in which the second temperature Tth2 is higher than or equal to the cooling threshold temperature Tthb, it is possible to quickly increase the flow rate of the coolant that flows through the internal passage 18 and into the oil warmer 50, thereby quickly raising the lubricant temperature.

(5) The water pump 80 is an engine-driven pump, which is actuated when the engine 10 is started. If the cooling passage had no thermostat 60, the coolant would circulate through the oil warmer 50 and the internal passage 18 immediately after starting of the engine 10. Thus, the oil warmer 50 would deprive the coolant of heat, retarding the warm-up of the engine 10. In contrast, in the present embodiment, since the thermostat 60 is provided in the coolant passage, the coolant that has flowed out from the internal passage 18 is prevented from flowing into the oil warmer 50 immediately after starting of the engine 10 from a temperature lower than the first temperature Tth1. This allows the engine 10 to be quickly warmed up.

(6) The part of the direct-coupling passage 44 that accommodates the thermostat 60 is made of the same metal (aluminum alloy) as that of the oil warmer 50. This not only increases the thermal conductivity from the oil warmer 50 to the thermostat 60, but also restricts concentration of stress at a position where the oil warmer 50 contacts the part of the direct-coupling passage 44 that accommodates the thermostat 60. This is because a difference in linear expansions scarcely occurs if the same material is used.

<Second Embodiment>

A cooling apparatus for an internal combustion engine according to a second embodiment will now be described with reference to the drawings. The differences from the first embodiment will mainly be discussed.

Figure 8:
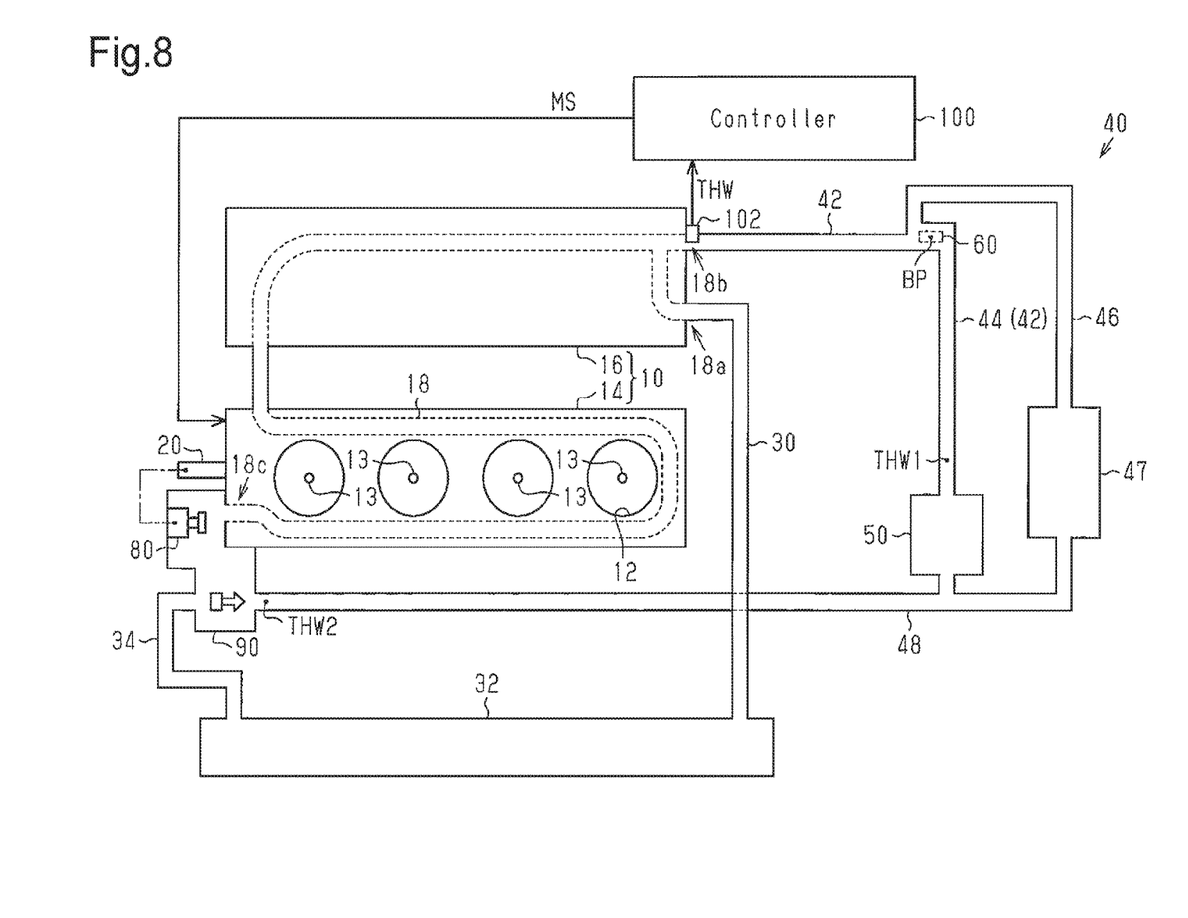
FIG. 8 is a diagram showing an engine system equipped with a cooling apparatus for an internal combustion engine according to a second embodiment.

FIG. 8 shows an engine system that is equipped with the cooling apparatus according to the present embodiment. In FIG. 8, the same reference numerals are given to the components that are the same as those in FIG. 1.

As shown in FIG. 8, in the present embodiment, the thermostat 60 is provided at the branch point BP, at which the branch passage 46 branches off from the outlet-side warmer passage 42.

Figure 9:
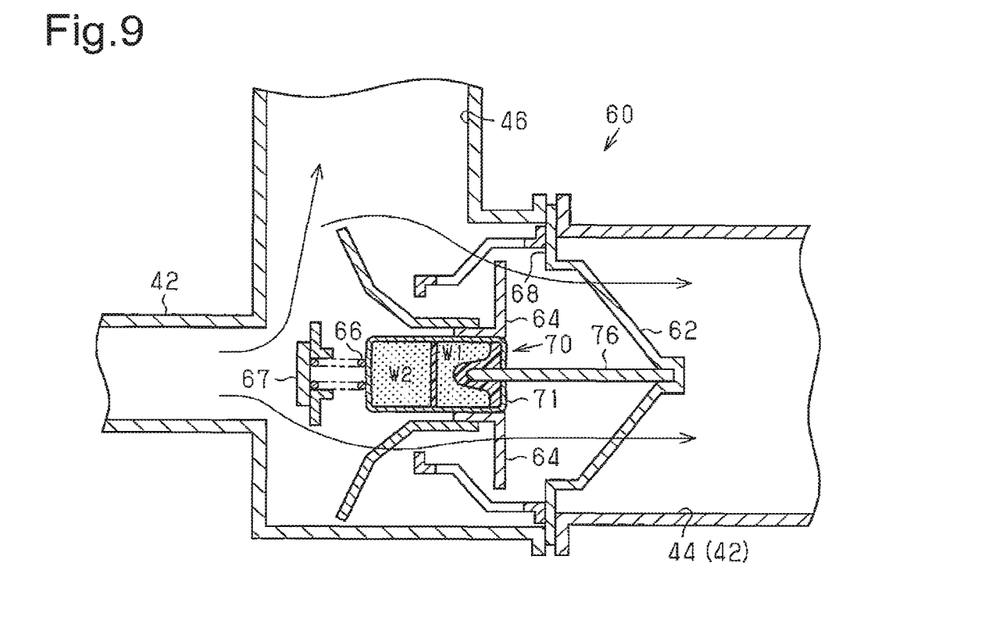
FIG. 9 is a cross-sectional view showing the thermostat for the oil warmer according to the second embodiment.

FIG. 9 illustrates the cross-sectional structure of the thermostat 60 according to the present embodiment. In FIG. 9, the same reference numerals are given to the components that are the same as those in FIG. 5.

As shown in FIG. 9, the direct-coupling passage 44 is fixed to the piston fixing portion 62. A spring support portion 67 is a member that fixes the position of the end of the spring 66 that is opposite from the piston fixing portion 62. The spring support portion 67 is fixed to the passage in the vicinity of the branch point BP.

When the first wax W1 and the second wax W2 in the thermostat 60 are solid, the elastic force of the spring 66 holds the valve member 64 in contact with the valve seat portion 68. In contrast, when the first wax W1 and the second wax W2 melt, the protruding amount of the piston 76 from the body 71 increases, so that the body 71 is displaced away from the piston fixing portion 62. This displaces the valve member 64 away from the piston fixing portion 62 and away from the valve seat portion 68. In other words, the thermostat 60 is switched to the open state. FIG. 9 illustrates the open state of the thermostat 60.

In the present embodiment, the first temperature Tth1, which is the melting point of the first wax W1, is set to, for example, 65° C., which is slightly lower than the lower limit value Tw.

Operation of the present embodiment will now be described.

If the thermostat 60 is in the closed state when the engine 10 is started, the coolant that has flowed out through the outlet 18b of the internal passage 18 flows into the heater core 47 via the outlet-side warmer passage 42 and the branch passage 46 and then flows into the inlet 18c of the internal passage 18. During this time, since the coolant that contacts the thermostat 60 in the outlet-side warmer passage 42 is the coolant that has flowed out through the outlet 18b, the temperature of that coolant is equivalent to the temperature THW of the coolant at the outlet 18b. When the temperature THW is higher than or equal to the first temperature Tth1 so that the first wax W1 melts, the thermostat 60 is opened and the coolant that has flowed out through the outlet 18b flows into the oil warmer 50. Thereafter, when the temperature THW is higher than or equal to the second temperature Tth2, the second wax W2 melts. This increases the degree of opening of the thermostat 60 so that the flow rate of the coolant that flows into the oil warmer 50 increases.

In addition to the advantages (1), (4), and (5) of the first embodiment, the second embodiment has the following advantage.

(7) The coolant that has reached the thermostat 60 from the upstream side is allowed to flow to the branch passage 46 even if the thermostat 60 is in the closed state. In other words, the bypass passage 40 is configured such that the coolant that has reached the thermostat 60 is allowed to flow to the downstream side of the thermostat 60 when the thermostat 60 is in the closed state. Accordingly, even if the thermostat 60 is in the closed state, the coolant that has reached the thermostat 60 is not retained in the vicinity of the thermostat 60. The temperature of the coolant that has reached the thermostat 60 from the upstream side is readily increased along with the temperature increase of the coolant flowing through the internal passage 18. Thus, since the temperature of the coolant that reaches the thermostat 60 from the upstream side can be regarded as the temperature inside the internal passage 18, the melting point (the first temperature Tth1) of the first wax W1 can be set such that the thermostat 60 is opened when the temperature in the internal passage 18 becomes equal to a desired temperature.

<Other Embodiments>

At least one feature of the above illustrated embodiments may be modified as follows.

Regarding the passage structure (a) Modification of the First Embodiment

In the passage structure shown in FIG. 1, the closed state of the thermostat 60 closes all the passages through which the coolant that has reached the thermostat 60 from the upstream side flows out. In other words, FIG. 1 shows a passage structure in which, when the thermostat 60 is in the closed state, the coolant that has reached the thermostat 60 is restricted from flowing out to the downstream side of the thermostat 60. Such a passage structure is not limited to the one illustrated in FIG. 1. For example, the branch passage 46 may be omitted from the cooling passage. In this case, the internal passage 18 may have a third outlet and the heater core 47 may be connected to the third outlet. Also, the heater core 47 may be connected to the outlet 18a. In this case, the downstream side of the heater core 47 merely needs to be connected to the inlet-side warmer passage 48.

In the case of the above passage structure, the part of the direct-coupling passage 44 in which the thermostat 60 is provided does not necessarily need to contact the oil warmer 50. For example, in the structure obtained by removing the branch passage 46 from the cooling passage shown in FIG. 1, the thermostat 60 may be separated from the oil warmer 50 and located close to the outlet 18b. In this case, changes in the position of the thermostat 60 varies the degree of correlation between the temperature of the coolant that has reached the thermostat 60 and the temperature of the coolant in the internal passage 18. By setting the first temperature Tth1 according to the degree of correlation, the coolant in the internal passage 18 is allowed to flow into the oil warmer 50 at appropriate timing.

(b) Modification of the Second Embodiment

FIG. 8 shows a passage structure having a passage (the branch passage 46) through which the coolant that has reached the thermostat 60 flows out from the upstream side flows out to the downstream side of the oil warmer 50 at least when the thermostat 60 is in the closed state. Such a passage structure is not limited to the one illustrated in FIG. 8. For example, the cooling passage shown in FIG. 1 may have a passage that connects the part of the direct-coupling passage 44 in which the thermostat 60 is arranged to the inlet-side warmer passage 48 while bypassing the oil warmer 50.

(c) Other Modifications

The direct-coupling passage 44 does not necessarily include a section in which coolant flows vertically downward as illustrated in FIG. 2. Even if coolant flows horizontally in the direct-coupling passage 44, for example, a sufficient distance from the branch point BP to the thermostat 60 allows the coolant temperature THW1 at the position of reaching the thermostat 60 to be lower than the temperature THW at the outlet 18a. In this case, the structure illustrated in the first embodiment is particularly effective.

The structure illustrated in FIG. 1 may have a valve member that cuts off the flow of coolant into the heater core 47. The valve member is configured to be opened when the user performs manipulation to manifest his/her intention to use the heater. The second embodiment (FIG. 8) may have a valve member that cuts off the flow of coolant into the heater core 47. In this case, since the thermostat 60 is opened and closed in accordance with the temperature of the coolant at the outlet 18b, the branch point BP is preferably arranged close to the outlet 18b.

The heat exchanger, which is connected in parallel with the oil warmer 50 and performs heat exchange between coolant and another matter is not limited to the heater core 47, but may be a throttle body or an EGR cooler. The EGR cooler is a cooling apparatus that performs heat exchange between EGR gas and coolant to cool the EGR gas with the coolant. The EGR gas refers to exhaust gas that is discharged from the engine combustion chamber and is then drawn to the combustion chamber via the intake passage. The throttle body refers to a device that performs heat exchange between the throttle valve and coolant. Further, two or more branch passages 46 may be provided, and different heat exchangers may be connected to the respective branch passages 46. In this case, the downstream side of each heat exchanger merely needs to be connected to the inlet-side warmer passage 48.

In addition to the outlet 18b, the cylinder head 16 may have an additional outlet that is connected to the inlet 18c with a passage, and a heat exchanger may be connected to a middle section of that passage.

The cylinder block 14 may have an outlet for coolant. That is, for example, in FIGS. 1 and 8, the outlet of the internal passage 18, which is formed in the cylinder block 14, may be connected to the outlet-side warmer passage 42.

Regarding the heat receiving structure of the thermostat

In the first embodiment, the part of the direct-coupling passage 44 in which the thermostat 60 is provided is entirely held in contact with the oil warmer 50. However, the configuration is not limited to this. For example, in the part of the direct-coupling passage 44 in which the thermostat 60 is provided, only a section on the downstream side may be held in contact with the oil warmer 50.

In the first embodiment, the thermostat 60 is arranged on the upstream side of the oil warmer 50. However, the configuration is not limited to this. The thermostat 60 may be arranged on the downstream side of the oil warmer 50. Even in this case, if at least a section of the part of the inlet-side warmer passage 48 in which the thermostat 60 is provided is arranged to contact the oil warmer 50, the first wax W1 receives heat from the oil warmer 50 and melts in accordance with the temperature of the coolant contacting the thermostat element 70.

Figure 10:
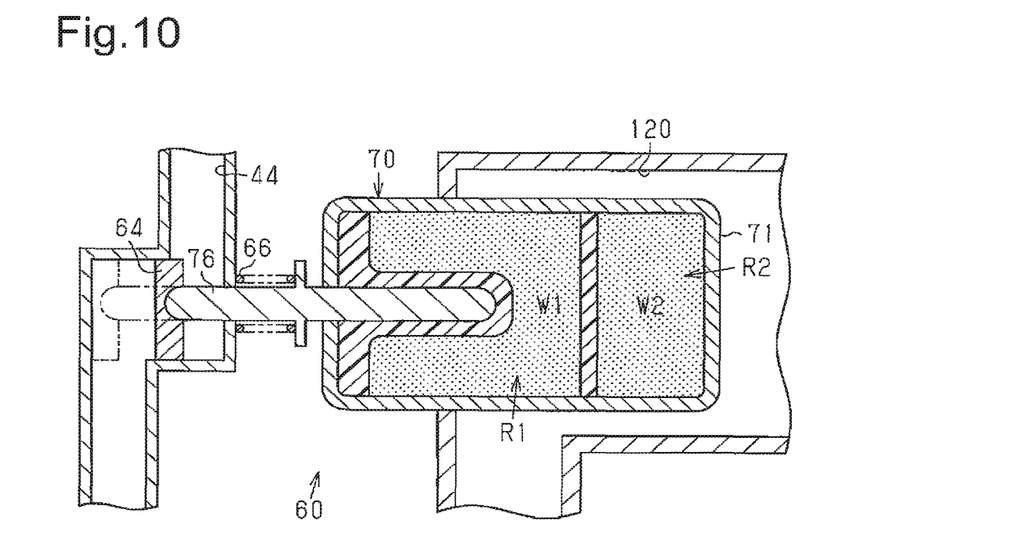
FIG. 10 is a cross-sectional view showing a thermostat for an oil warmer according to a modification.

The fluid that contacts the thermostat element 70 is not limited to coolant, but may be lubricant, for example. FIG. 10 shows a structure in which the fluid that contacts the thermostat element 70 is lubricant. In FIG. 10, the same reference numerals are given to the components that are the same as those in FIG. 5 and other drawings.

As shown in FIG. 10, the body 71 of the thermostat element 70 is fixed to a passage 120 for lubricant to protrude into the passage 120. The piston 76 extends into the direct-coupling passage 44 and is coupled to the valve member 64. The piston 76 is urged to retract into the body 71 by the elastic force of the spring 66. FIG. 10 illustrates a case in which the first wax W1 and the second wax W2 are both solid and thus the piston 76 is at the rightmost position. In contrast, when the first wax W1 or the second wax W2 melts, the piston 76 is displaced away from the body 71 so that the thermostat 60 is opened. In FIG. 10, the long dashed double-short dashed lines show the valve member 64 in the open state.

Regarding the thermostat 60

(a) Regarding the Melting Point of Wax

In the first embodiment, the first temperature Tth1, which is the melting point of the first wax W1, is 40° C. However, the first temperature Th1 is not limited to 40° C. For example, the first temperature Tth1 may be higher than 40° C. and lower than or equal to 50° C. Further, the first temperature Tth1 may be higher than or equal to 30° C. and lower than 40° C. In this case, in summer, the first wax W1 may have melted immediately before the engine 10 is started, and the thermostat 60 is in the open state. However, in such a case, since the coolant temperature in the internal passage 18 is higher than or equal to 30° C., the delay of the warm-up of the engine 10 due to the open state of the thermostat 60 is short at starting of the engine 10. When the coolant temperature is as low as the level at which the thermostat 60 is in the closed state immediately before the engine 10 is started, starting of the engine 10 with the thermostat 60 in the closed state advances the warm-up of the engine 10.

In the first embodiment, the first temperature Tth1 is not limited to be lower than or equal to 50° C.

In the second embodiment, the first temperature Tth1 is not limited to 65° C., but may be any temperature in the range from 60 to 80° C.

In the first and second embodiments, the second temperature Tth2 does not necessarily need to set to 75° C. However, the second temperature Tth2 is preferably set to a value lower than the cooling threshold temperature Tthb to quickly increase the lubricant temperature. Also, in the first embodiment, the second temperature Tth2 is preferably set to a temperature higher than an expected highest value of the temperature THW of the outlet 18b of the internal passage 18 when the temperature THW1 of the coolant contacting the thermostat 60 becomes the first temperature Tth1 in a case in which the engine 10 is started from a temperature lower than or equal to the predetermined temperature (for example 30° C.)

(b) Regarding Different Types of Wax

The thermostat element 70 does not necessarily need to include only the first wax W1 and the second wax W2. For example, the thermostat element 70 may include three or more types of wax of different melting points separated by partitions.

Figure 11:
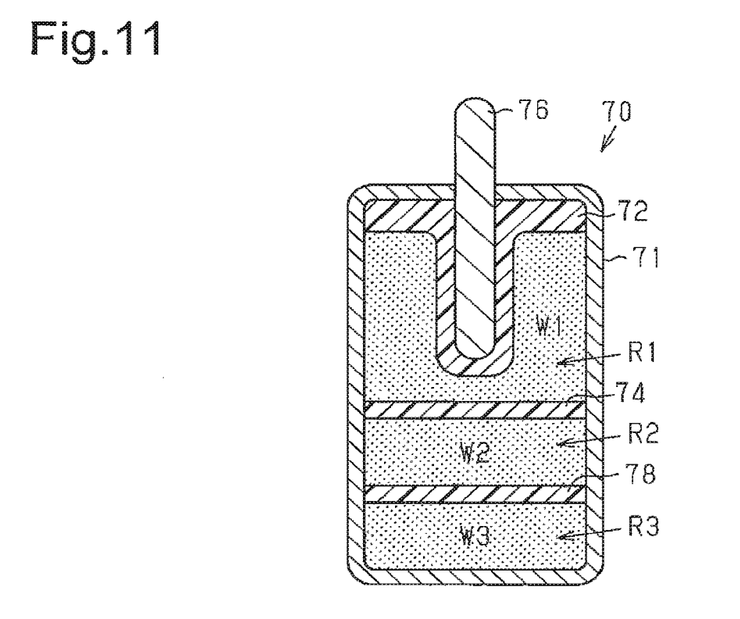
FIG. 11 is a cross-sectional view showing a thermostat element according to a modification.

FIG. 11 illustrates the structure of a thermostat element 70 with three different types of wax. In FIG. 11, the same reference numerals are given to the components that are the same as those in FIG. 5 and other drawings. The thermostat element 70 shown in FIG. 11 includes a first thermo-wax chamber R1 and a second thermo-wax chamber R2, which are defined by the body 71 partition members 72, 74, 78. The thermostat element 70 additionally has a third thermo-wax chamber R3, which is partitioned from the second thermo-wax chamber R2 by the partition member 78. The third thermo-wax chamber R3 is filled with a third wax W3, the melting point of which is higher than the melting point of the second wax W2. The partition member 78 can be displaced in the axial direction of the piston 76.

Compared to the structure that includes only the first wax W1 and the second wax W2, the rise rate of the temperature of the lubricant in the oil warmer 50 can be more flexibly controlled. The same advantages are achieved by structures with four or more types of wax of different melting points, which are separated by partitions. In a case in which three or more types of wax of different melting points are separated by partitions, the highest melting point may be set higher than or equal to the cooling threshold temperature Tthb. Thus, when the demand for cooling the lubricant is particularly high, the lubricant cooling performance can be increased by maximizing the degree of opening of the thermostat 60.

(c) Others

Figure 12:
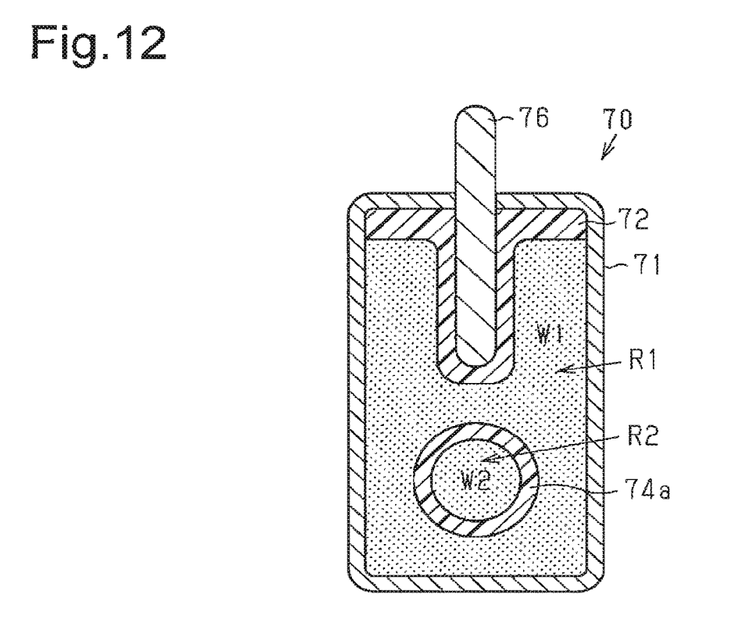
FIG. 12 is a cross-sectional view showing a thermostat element according to a modification.

The body 71 of the thermostat element 70 does not necessarily need to form a part of the members defining the wax chambers. For example, the structure shown in FIG. 12 may be employed. In FIG. 12, the same reference numerals are given to the components that are the same as those in FIG. 5 and other drawings. As shown in FIG. 12, the second wax W2, which fills the second thermo-wax chamber R2, is separated from the first wax W1 in the first thermo-wax chamber R1 by a stretchable partition member 74a. In this structure, the second wax W2 receives heat from the first wax W1 via the partition member 74a and melts. Accordingly, the partition member 74a is stretched and the second thermo-wax chamber R2 is expanded.

Also, the partition member 72 does not necessarily need to be made of an easily-stretchable material such as rubber. For example, the partition members may be plate-shaped members that can be displaced in the axial direction of the piston 76 and regarded as rigid bodies.

Regarding the Oil Warmer 50

The oil warmer 50 does not necessarily need to be made of an aluminum alloy. However, in order to transfer heat to the coolant at the part of the direct-coupling passage 44 in which the thermostat 60 is provided as in the first embodiment, the oil warmer 50 is preferably made of a material having a high thermal conductivity.

In the above illustrated embodiments, a part of the passage that is connected to the coolant inlet of the oil warmer 50 is unitized with the oil warmer 50. This structure may be omitted. Also, in the above illustrated embodiments, a part of the passage that is connected to the coolant outlet of the oil warmer 50 is unitized with the oil warmer 50. This structure may be omitted.

The shape of the oil warmer 50 is not limited to the one illustrated in FIG. 4, but may be circular, for example.

Regarding the Flow-Rate Regulator 90

In the above illustrated embodiments, the flow-rate regulator is configured solely by the thermostat 90, which is mechanically opened and closed. For example, the flow-rate regulator may be configured by the controller 100 and a thermostat that includes a heater for heating the wax 92a. In this case, the controller 100 controls the degree of opening of the thermostat by energizing the heater in accordance with the temperature THW of the coolant at the outlet 18b detected by the temperature sensor 102. For example, in a configuration that performs feedback control to cause the temperature THW to converge to a target value, the heating by the heater is not executed if the temperature THW is lower than the target value. Thus, the target value merely needs to be the cooling threshold temperature Tthb, which is a temperature at which the amount of the coolant that flows into the radiator 32 is controlled to be greater than zero by the flow-rate regulator. In this case, however, the target value needs to be lower than or equal to the melting point of the wax 92a. Although the degree of opening of the thermostat does not become zero simultaneously when the heating by the heater is stopped, the flow-rate regulator, which regulates the degree of opening in accordance with the temperature of the coolant, can be assumed to control the coolant amount to zero when the heating by the heater is not being executed. As the temperature of coolant put in a flowing state by the water pump 80, the temperature THW at the outlet 18b does not necessarily need to be used. For example, a temperature detected by a sensor that detects the temperature of the coolant in the cylinder block 14 may be used. Further, a sensor that detects a temperature of matter other than the coolant may be used. When the flow-rate regulator varies the time ratio of the energization time of the heater in one cycle of periodic energization and non-energization, the lower limit value of the temperature at which the time ratio is greater than zero may be the cooling threshold temperature Tthb.

The flow-rate regulator is not limited to the one that has wax. For example, the flow-rate regulator may include a solenoid valve, which selectively opens and closes a section between the inlet-side radiator passage 34 and the inlet 18c of the internal passage 18, and a controller that energizes the solenoid valve. In a configuration in which the controller performs feedback control to cause the temperature THW to converge to a target value, the target value is the cooling threshold temperature Tthb. Also, in a configuration in which the controller sets the opening degree of the solenoid valve in accordance with the temperature instead of performing such feedback control, the lower limit value of the temperature that makes the opening degree a value greater than zero is the cooling threshold temperature Tthb. When the solenoid valve is a normally closed solenoid valve and varies the time ratio of the energization time of the solenoid in accordance with the temperature, the lower limit value of the temperature that makes the time ratio a value greater than zero is the cooling threshold temperature Tthb.

Regarding the Water Pump 80

The water pump 80 is not limited to an engine-driven pump, but may be an electric pump, starting and stopping of which is controlled by the controller 100. In this case, to promote the warm-up of the engine 10, it is preferable that the controller 100 stop the electric pump from when the engine is started to when the temperature THW of coolant becomes higher than or equal to the predetermined temperature. Even in this case, if the thermostat 60 is not provided, starting the electric pump when the temperature of the lubricant is not sufficiently high can cause high-temperature coolant to flow into the oil warmer 50. This may cause a thermal shock. It is thus significant to provide the thermostat 60. In a case in which an electric pump is used, when a member that indicates the user's intension to use the heater core 47 is manipulated in the passenger compartment, the controller 100 may perform control for keeping the electric pump operating. In this case, if the control for keeping the electric pump operating is executed from when the engine 10 is started, it is the same as the configuration that uses an engine-driven pump. Thus, the thermostat 60 operates in the same manner and achieves the same advantages as the above illustrated embodiments.

Other Modifications

The engine 10 is not limited to a four-cylinder engine. The engine 10 is not limited to a spark-ignition engine such as a gasoline engine, but may be a compression ignition engine that uses, for example, light oil or the like. The transmission is not limited to a continuously variable transmission, but may be a multi-speed transmission.

Therefore, the present examples and embodiments are to be considered as illustrative and not restrictive and the disclosure is not to be limited to the details given herein.

The invention claimed is:

1. A cooling apparatus for an internal combustion engine, comprising:
    an oil warmer, which performs heat exchange between coolant of the engine and lubricant of a transmission;
    an internal passage, which is provided in the engine and through which the coolant flows;
    a radiator;
    a radiator passage, which connects the internal passage to the radiator;
    a warmer passage, which causes coolant that has flowed out through an outlet of the internal passage to flow into an inlet of the internal passage, wherein the oil warmer is connected to a middle section of the warmer passage, and the warmer passage comprises a bypass passage, which causes the coolant that has flowed out through the outlet of the internal passage to flow into the inlet of the internal passage while bypassing the radiator;
    a water pump, which is configured to cause the coolant in the internal passage and the warmer passage to flow;
    a flow-rate regulator, wherein, in accordance with a temperature of the coolant, which is put in a flowing state by the water pump, the flow-rate regulator regulates an amount of the coolant that has flowed out through the outlet of the internal passage and flows through each of the bypass passage and the radiator passage; and
    a thermostat, which is configured to regulate an amount of coolant that flows into the oil warmer, wherein
    the thermostat includes
        a valve member, which is configured to close the warmer passage,
        a body, and
        a plurality of types of wax, which are accommodated in the body and separated from each other,
    the thermostat is configured to determine a degree of opening of the valve member in accordance with amounts of expansion of the respective types of wax caused by melting of the respective types of wax,
    the body contacts one of the lubricant and the coolant in the warmer passage,
    the types of wax include
        a first wax, which melts at a first temperature, and
        a second wax, which melts at a second temperature which is higher than the first temperature, the second temperature being lower than a cooling threshold temperature, which is a lower limit value of a temperature at which an amount of coolant that flows out through the outlet of the internal passage and into the radiator is controlled to be a value greater than zero by the flow-rate regulator.

2. The cooling apparatus according to claim 1, wherein the warmer passage is configured such that, in a closed state of the thermostat, the coolant that has reached the thermostat is restricted from flowing out to a downstream side of the thermostat.

3. The cooling apparatus according to claim 1, wherein the thermostat is located on an upstream side of the oil warmer in the warmer passage, and the cooling apparatus further comprises a branch passage, which is connected to a part of the warmer passage that is located on an upstream side of the thermostat and is separated from the thermostat.

4. The cooling apparatus according to claim 2, wherein the coolant in the warmer passage contacts the body of the thermostat, and at least a section of a part of the warmer passage in which the thermostat is provided is arranged to contact the oil warmer.

5. The cooling apparatus according to claim 1, wherein the coolant in the warmer passage contacts the body of the thermostat, and the cooling apparatus further comprises a passage that is connected to the warmer passage and allows the coolant that has reached the thermostat to flow out to a downstream side of the oil warmer at least when the thermostat is in a closed state.

6. The cooling apparatus according to claim 1, wherein the thermostat is located on an upstream side of the oil warmer in the warmer passage, and the cooling apparatus further comprises a branch passage, which is connected to a part of the warmer passage in which the thermostat is provided.

7. The cooling apparatus according to claim 1, wherein the water pump is an engine-driven pump, which is actuated when the engine is started.

8. A cooling apparatus for an internal combustion engine, comprising:
    an oil warmer, which performs heat exchange between coolant of the engine and lubricant of a transmission;
    an internal passage, which is provided in the engine and through which the coolant flows;
    a warmer passage, which causes coolant that has flowed out through an outlet of the internal passage to flow into an inlet of the internal passage, wherein the oil warmer is connected to a middle section of the warmer passage;

a water pump, which is configured to cause the coolant in the internal passage and the warmer passage to flow; and a thermostat, which is configured to regulate an amount of coolant that flows into the oil warmer, wherein the thermostat includes
- a valve member, which is configured to close the warmer passage,
- a body, and
- a plurality of types of wax, which are accommodated in the body and separated from each other, the thermostat is configured to determine a degree of opening of the valve member in accordance with amounts of expansion of the respective types of wax caused by melting of the respective types of wax, the body contacts one of the lubricant and the coolant in the warmer passage, the types of wax include
- a first wax, which melts at a first temperature, and
- a second wax, which melts at a second temperature which is higher than the first temperature, the thermostat is located on an upstream side of the oil warmer in the warmer passage, and the cooling apparatus further comprises a branch passage, which is connected to a part of the warmer passage that is located on an upstream side of the thermostat and is separated from the thermostat.

9. The cooling apparatus according to claim 8, wherein the water pump is an engine-driven pump, which is actuated when the engine is started.

10. A cooling apparatus for an internal combustion engine, comprising:

an oil warmer, which performs heat exchange between coolant of the engine and lubricant of a transmission;

an internal passage, which is provided in the engine and through which the coolant flows;

a warmer passage, which causes coolant that has flowed out through an outlet of the internal passage to flow into an inlet of the internal passage, wherein the oil warmer is connected to a middle section of the warmer passage;

a water pump, which is configured to cause the coolant in the internal passage and the warmer passage to flow; and a thermostat, which is configured to regulate an amount of coolant that flows into the oil warmer, wherein the thermostat includes
- a valve member, which is configured to close the warmer passage,
- a body, and
- a plurality of types of wax, which are accommodated in the body and separated from each other, the thermostat is configured to determine a degree of opening of the valve member in accordance with amounts of expansion of the respective types of wax caused by melting of the respective types of wax, the body contacts one of the lubricant and the coolant in the warmer passage, the types of wax include
- a first wax, which melts at a first temperature, and
- a second wax, which melts at a second temperature which is higher than the first temperature, warmer passage is configured such that, in a closed state of the thermostat, the coolant that has reached the thermostat is prevented from flowing out to a downstream side of the thermostat, the coolant in the warmer passage contacts the body of the thermostat, at least a section of a part of the warmer passage in which the thermostat is provided is arranged to contact the oil warmer, and when the engine is started from a state in which a temperature of the coolant is lower than or equal to 30° C., the first wax starts to melt during a period when the temperature of the coolant at an upstream side of the thermostat is lower than or equal to the temperature of the lubricant in the oil warmer.

11. The cooling apparatus according to claim 10, wherein the water pump is an engine-driven pump, which is actuated when the engine is started.

* * * * *